United States Patent
Kang et al.

(10) Patent No.: US 7,391,789 B2
(45) Date of Patent: Jun. 24, 2008

(54) AD-HOC NETWORK WIRELESS COMMUNICATION SYSTEM AND METHOD THEREOF

(75) Inventors: Chung-gu Kang, Seoul (KR); Won-soo Kim, Yongin-si (KR); Il-whan Kim, Incheon (KR)

(73) Assignee: Samsung Electronics Co., Ltd., Suwon (KR)

( * ) Notice: Subject to any disclaimer, the term of this patent is extended or adjusted under 35 U.S.C. 154(b) by 696 days.

(21) Appl. No.: 10/930,900

(22) Filed: Sep. 1, 2004

(65) Prior Publication Data

US 2005/0089057 A1    Apr. 28, 2005

(30) Foreign Application Priority Data

Oct. 27, 2003    (KR)    ............ 10-2003-0074987

(51) Int. Cl.
*H04L 12/413* (2006.01)
(52) U.S. Cl. .................. 370/445; 370/329
(58) Field of Classification Search ........... 370/445, 370/443, 329
See application file for complete search history.

(56) References Cited

U.S. PATENT DOCUMENTS 5,844,905 A * 12/1998 McKay et al. ............ 370/443
6,556,582 B1 * 4/2003 Redi ........................ 370/443
2005/0180356 A1 * 8/2005 Gillies et al. ............. 370/329

* cited by examiner

*Primary Examiner*—Chi Pham
*Assistant Examiner*—Albert T. Chou
(74) *Attorney, Agent, or Firm*—Sughrue Mion, PLLC

(57) ABSTRACT

An ad-hoc network wireless communication system transmits data packets from one hop to another hop in a relay manner, and includes a transmitting node for transmitting a RTS message in order to transmit the data packets, and a receiving node, existing in a next hop of the transmitting node, for transmitting a CTS message in response to the RTS message transmitted from the transmitting node. The receiving node transmits the CTS message to another receiving node successively connected to the receiving node in response to the transmitted CTS message, and the transmitting node transmits the data packets to the receiving node in the case that the CTS message transmitted by the receiving node of the next hop is received over a predetermined number of times. The ad-hoc network wireless communication system can maximize the communication efficiency in a multi-hop network with its complexity minimized by extending a MAC protocol based on a IEEE 802.11 DCF to a reservation-based MAC in the multi-hop network.

12 Claims, 15 Drawing Sheets

○ Interference node  ○ Connnection node (a)A single connection scenario (a)Multiple connection scenario

AD-HOC NETWORK WIRELESS COMMUNICATION SYSTEM AND METHOD THEREOF

CROSS-REFERENCE TO RELATED APPLICATION

This application claims priority from Korean Patent Application No. 2003-74987, filed Oct. 27, 2003, in the Korean Intellectual Property Office, the disclosure of which is incorporated herein by reference.

BACKGROUND OF THE INVENTION

1. Field of the Invention

The present invention relates to an ad-hoc network wireless communication system and a method thereof, and more particularly, to an ad-hoc network wireless communication system and a method thereof that makes it possible to perform a reliable multi-hop ad-hoc communication if a MAC (Media Access Control) protocol based on a CSMA/CA (Carrier Sense Multiple Access/Collision Avoidance) protocol is extended to the multi-hop.

2. Description of the Related Art

With the development of the hardware technology and the explosive increase of the spread and demand for portable terminals such as notebook computers, PDAs (Personal Digital Assistant), etc., there have been active attempts towards grafting the concept of wireless mobile communications on data communications based on the existing Internet protocol. A representative basic technology for this is an MP (Mobile IP) (hereinafter referred to as 'mobile IP').

Currently, a host, which uses a mobile IP in a wireless LAN (Local Area Network) environment, should perform a handoff in two of the OSI (Open System Interconnection) layers when it leaves a present cell and moves to a new cell. A handoff performed in a MAC layer is for securing a reliable wireless link in the new cell, and a mobile IP handoff occurring in the IP layer is for providing positional clarity of the host that makes it possible to continuously maintain service during the movement of the host without any change of the IP address.

A wireless LAN, which is a data communication system for providing mobility and scalability, facilitates its construction and management in comparison to the existing wire LAN, and currently provides a data transmission speed of 11 Mbps. Also, the mobile host on the wireless LAN can receive Internet service by connecting to the wire LAN at a high rate at any place without a cable.

The standard related to a physical layer and a data-link layer of the wireless LAN is described in the IEEE (Institute of Electrical and Electronics Engineers) 802.11. The wireless LAN is constructed by an ad-hoc network composed of a wireless terminal only or an infrastructure network connected to a wire LAN.

FIG. 1 is a view schematically illustrating an infrastructure network combined with a wire/wireless network. Referring to FIG. 1, the infrastructure network includes a BSS (Basic Service Set), an ESS (Extended Service Set), an AP (Access Point), a portal, and a DS (Distribution System). The AP is a bridge between a wire network and a wireless network, and connects the wireless host to the existing wire LAN such as an Ethernet. The mobile host can connect to the Internet through the portal. At this time, a cell is formed centering around the AP, and this is called the BSS. Several BSSs constitute the ESS, and the DS determines a forwarding path of packets to be transferred to the mobile host.

FIG. 2 is a view schematically illustrating an ad-hoc network.

In the wireless LAN, which is different from the wire network, the position of the host is changed at all times. Accordingly, the host, which leaves a present cell and moves to another cell, should determine a new AP in order to re-determine the communication link, and this process is called a "handoff" or "roaming" in the MAC layer. For a smooth handoff, the IEEE 802.11 standard provides techniques such as scanning, re-association and so on. Hereinafter, protocols in the ad-hoc network will be explained.

The mobile host, if the signal strength of the AP signal becomes lower than a specified value, searches for a new AP, and selects an AP that has the biggest signal. This process is called the scanning. If the AP is determined by the scanning method, the mobile host informs its existence to a new AP through the re-association process. Then, the AP informs the new position information of the mobile host to the DS, and the DS updates the position information of the host.

The wireless LAN adopts the CSMA (Carrier Sense Multiple Access) method that shares physical media in the same manner as the wire LAN. However, a collision may be frequently produced unlike the wire LAN. For example, in FIG. 2, although a node C is in a transmission range of a node B, it is outside a transmission range of a node A. Accordingly, while the node A transmits a message to the node B, the node C cannot sense the message transmitted from the node A to the node B, and thus the node C can transmit a message to the node B by accessing a channel to the node B. In this case, the message transmitted from the node C causes interference in receiving the message of the node B, and the node C becomes a hidden host or a hidden terminal of the node A. In order to solve this problem, many studies have been made for protocols such as a MACA (Medium Access Collision Avoidance) using a RTS/CTS (Request To Send/Clear To Send), a MACAW (MACA with Acknowledgement) obtained by improving the MACA using a selective control frame, a FAMA (Floor Acquisition Multiple Access) using both a non-persistent carrier sensing and the RTS/CTS, an IEEE 802.11 MAC DCF (Distributed Control Function) of a CSMA/CA (Carrier Sense Multiple Access/Collision Avoidance) supporting the carrier sensing and the RTS/CTS, a DBTMA (Dual Busy Tone Multiple Access) that is a MAC protocol based on the RTS/CTS, etc.

FIG. 3 is a view explaining a MAC protocol. Referring to FIG. 3, the host that will transmit data first confirms whether the wireless link is in use. If the wireless link is in use, the host re-attempts confirmation after waiting a predetermined time. If it is confirmed that the wireless link is not in use, the host broadcasts a control message named 'RTS (Request To Send)' (No. 1). In the RTS message, an address of destination and a transmission time are recorded, and the neighboring hosts, which intend to use the wireless link through the RTS message, can estimate how long they will wait. Meanwhile, the host, which has received the RTS, transmits a CTS (Clear To Send) message to the transmitting host only in the case that there is not danger of collision (No. 2). The transmitting host, which has received the CTS, transmits data without fear of collision (No. 3), and waits for an ACK (acknowledgement) message for acknowledging receipt of the data (No. 4). If the transmitting host fails to receive the ACK message, it retransmits the data for a predetermined number of times until it succeeds.

In the MACA protocol, the hidden host can considerably be removed through the RTS/CTS packet change as described above. Due to this advantage, the IEEE 802.11 DCF mechanism has introduced the MACAW system and standardized the DCF.

FIG. 4 is a view illustrating the operational principle of the MACAW protocol. Referring to FIG. 4, in the case that a node A intends to communicate with a node D that is located outside a communication range, the node A transmits the RTS message to a node B that is located inside the communication range. The node B transmits the CTS in response to the received RTS. When the CTS message transmitted by the node B reaches the node A, the node A transmits packets to the node B in response to the received CTS message, and the node B transmits the ACK message in response to the received packets. After the ACK message is transmitted, a random back-off time is produced to avoid the collision on the network. Thereafter, the same process as above is performed from the node B to a node C, and from the node C to the node D, resulting in that the node A can communicate with the node D located outside the communication range.

Meanwhile, the MACAW is a mechanism optimized to the ad-hoc network based on a one-hop. Accordingly, as shown in FIG. 4, in the case that the mechanism is extended to a multi-hop, at least 2N RTS/CTS control packets and N ACK packets are required per N-hop communication. Also, a random back-off mechanism is required per hop. These control packets and the random back-off mechanisms cause a network overhead in a multi-hop environment, and increase an end-to-end delay.

Although the hidden hosts are considerably removed through the RTS/CTS packet exchange, the hidden hosts as illustrated in FIGS. 5A and 5B still remain in the multi-hop environment. That is, as shown in FIG. 5A, in the case that the node A intends to communicate with a node E located outside the communication range, it transmits the RTS message to the node B located within the communication range. The node B transmits the CTS message in response to the received RTS message. At this time, the CTS message transmitted by the node B is also transferred to the node C located within the communication range of the node B.

If the node C transmits the RTS message in order to communicate with the node D, the RTS message transmitted by the node C would also be transferred to the node B. In this case, the node C may not receive the CTS message transferred from the node B to the node C due to the transmission of the RTS message transmitted by itself. Also, a mutual collision may occur between the data packets transmitted from the node A to the node B and the data packets transmitted by the node C.

Also, as shown in FIG. 5B, in the case that the RTS message is transmitted from the node A to the node B and the RTS message is transmitted from the node D to the node C, a mutual collision may occur between the CTS message transmitted by the node B and the RTS message transmitted from the node D. Also, a mutual collision may occur between the data packets transmitted from the node A to the node B and the CTS message transmitted by the node C.

In order to solve the above-described problems, the MACA-BI has proposed a receiver initiated handshaking system. In this system, the transmission of a transmitting node is initiated in a manner that a receiving node transmits RTR (Ready To Receive) packets to the transmitting node without using the RTS control packets. The MACA-BI can reduce the number of RTS/CTS packets required for the N-hop communication to N at minimum. Also, the MACA-BI supports the RTR transmission of the receiving node by piggybacking the traffic generation characteristics owned by itself to the data packets. However, since the MACA-BI should perform a channel access through the RTS with respect to the node that initially performs the channel access, it requires the same system as the MACA. Also, since the MACA-BI uses the RTR transmission mechanism based on a traffic generating history of the transmitting node, it takes a scheduling system that is difficult to be practically implemented.

In order to solve the problems of the MACA-BI as described above, a MARCH protocol has been proposed. The operation principle of the MARCH protocol is illustrated in FIG. 6. Referring to FIG. 6, the first packet-transmitting node of the MARCH protocol informs a data transmission to the receiving node through an RTS control packet. Then, the receiving node informs the traffic initiation time point through the transmission of a CTS packet to a receiving node of the next hop as it transmits a confirmation packet of the RTS to the transmitting node through the CTS control packet. Through the above-described process, the MARCH protocol can reduce the number of RTS/CTS packets required for the N-hop communication to N+1 at minimum, and propose a design that can be practically implemented as well.

However, the MARCH protocol has the drawbacks in that it still has the same problems of hidden host as involved in the MACAW protocol, and causes the problems of new hidden host as shown in FIG. 7. That is, in the case that the RTS message is transmitted from the node A to the node B and the RTS message is transmitted from the node D to the node E, a mutual collision may occur between the CTS message outputted from the node B and the data packet outputted from the node D, and in this case, the node C becomes unable to output the CTS message, resulting in that a random back-off mechanism is required after the timeout process.

Also, in the multi-hop network environment, the MARCH protocol may cause a collision between the data and the CTS due to the transmission time difference between the nodes on two paths of the different connections performed according to the mechanism of the MARCH protocol as shown in FIG. 8.

FIG. 9 is a view illustrating a CTS blocking problem caused in the MARCH protocol. As shown in FIG. 9, in the case that communications are performed in the different connections according to the MARCH mechanism, the node C, after receiving the CTS message of the node B, disregards the RTS message of the node D by changing its mode to a standby mode at a time point that it intends to transmit the CTS message to the node B. Thereafter, the node C may be unable to transmit the CTS message due to the data packet transmission of the node D at a time point that it intends to transmit the CTS message, and the random back-off mechanism is required after the timeout process. Since this phenomenon is due to the collision occurring between the CTS packet and the data packet that is relatively longer than the CTS message unlike the MACAW, its probability of occurrence becomes greater than that of the hidden host of the MACAW.

As described above, the MARCH mechanism is liable to greatly heighten the probability of occurrence of hidden host while it reduces the number of RTS/CTS control packets.

SUMMARY OF THE INVENTION

An object of the invention is to solve at least the above-identified problems and/or disadvantages and to provide at least the advantages described hereinafter.

Another object of the present invention is to provide an ad-hoc network wireless communication system and a method thereof which is free from a hidden host and has an improved end-to-end delay characteristic and a superior throughput in comparison to the DCF (Distributed Control Function) in the case that a CSMA/CA-based MAC protocol is extended to a multi-hop.

To achieve the above aspects and/or other features of the present invention, there is provided an ad-hoc network wireless communication system that transmits data packets from one hop to another hop in a relay manner, the communication system including a transmitting node for transmitting a request-to-send (RTS) message in order to transmit the data packets, and a receiving node, existing in a next hop of the transmitting node, for transmitting a clear-to-send (CTS) message in response to the RTS message transmitted from the transmitting node. At this time, the receiving node transmits the CTS message to another receiving node successively connected to the receiving node in response to the transmitted CTS message, and the transmitting node transmits the data packets to the receiving node in the case that the CTS message transmitted by the receiving node of the next hop is received over a predetermined number of times.

Here, in accordance with one embodiment, the receiving node includes a receiving unit for receiving the RTS message and/or the CTS message, a message conversion unit for converting the received CTS message into the RTS message, and a transmitting unit for transmitting the CTS message in response to the received RTS message and/or the converted RTS message.

Also, according to a further embodiment, the receiving node existing in the next hop of the transmitting node transmits the CTS message after a DCF-inter-frame-space (DIFS) time in response to the converted RTS message if the CTS message is received from another receiving node existing in the next hop.

Also, according to yet another embodiment, the receiving node further includes a piggyback unit for piggybacking an acknowledgement (ACK) message to the received data packet. At this time, the transmitting unit transmits the data packet to which the ACK message is piggybacked by the piggyback unit to another receiving node. Preferably, the receiving node and the transmitting node have the same construction.

According to another embodiment, the transmitting node includes a counter for counting a number of receptions of the CTS message received from the receiving node. Here, the transmitting node transmits the data packet to the receiving node if the number of receptions of the CTS message counted by the counter is 2.

In another aspect of the present invention, there is provided a wireless communication method for an ad-hoc network wireless communication system that transmits data packets from one hop to another hop in a relay manner, the communication method including the steps of (a) a transmitting node transmitting a request-to-send (RTS) message to a receiving node existing in a next hop in order to transmit the data packets, (b) the receiving node transmitting a clear-to-send (CTS) message in response to the transmitted RTS message, (c) the receiving node transmitting the CTS message to another receiving node successively connected to the receiving node in response to the transmitted CTS message, and (d) the transmitting node transmitting the data packets to the receiving node of the next hop in the case that the transmitting node receives the CTS message transmitted by the receiving node of the next hop over a predetermined number of times.

According to another embodiment, the wireless communication method further includes the steps of (e) the receiving node receiving the RTS message and/or the CTS message, and (f) the receiving node converting the received CTS message into the RTS message, wherein the CTS message is transmitted in response to the received RTS message and/or the converted RTS message.

According to yet another embodiment, the receiving node existing in the next hop of the transmitting node transmits the CTS message after a DCF-inter-frame-space (DIFS) time in response to the converted RTS message if the CTS message is received from another receiving node existing in the next hop.

Also, according to a further embodiment, the wireless communication method further includes the steps of (g) the receiving node piggybacking an acknowledgement (ACK) message to the received data packet, and (h) transmitting the data packet to which the ACK message is piggybacked at step (g) to another receiving node.

According to another embodiment, the wireless communication method further includes the step of (i) the transmitting node counting a number of receptions of the CTS message received from the receiving node. Here, the transmitting node transmits the data packet to the receiving node if the number of receptions of the CTS message counted at step (i) is 2.

The ad-hoc network wireless communication system according to the present invention can maximize the communication efficiency in a multi-hop network with its complexity minimized by extending a MAC protocol based on a IEEE 802.11 DCF to a reservation-based MAC in the multi-hop network.

BRIEF DESCRIPTION OF THE DRAWINGS

The above objects and other advantages of the present invention will become more apparent by describing in detail an exemplary embodiment thereof with reference to the attached drawings in which.

DETAILED DESCRIPTION OF EXEMPLARY EMBODIMENTS

Figure 1:
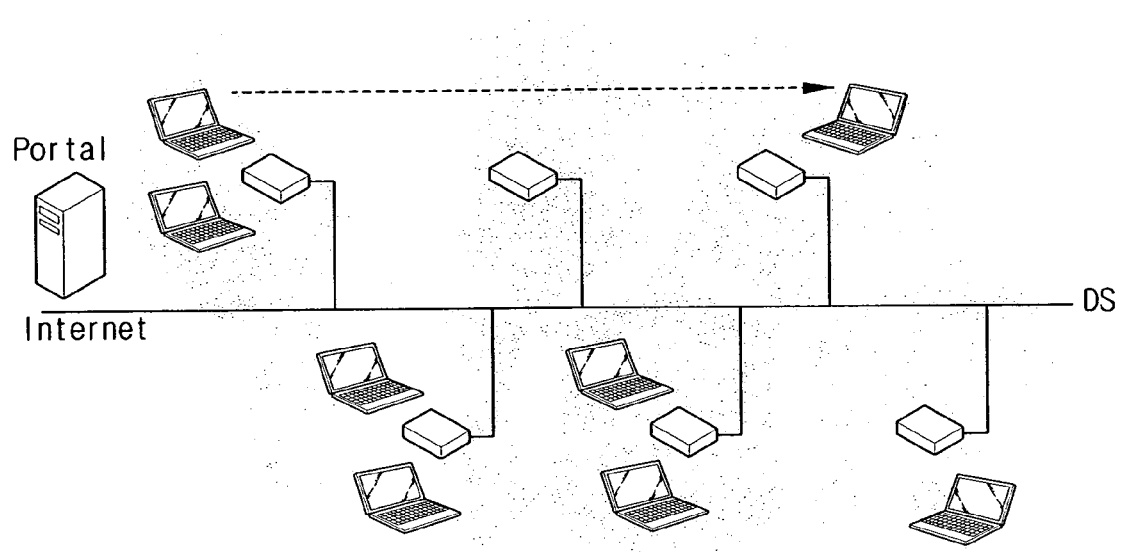
FIG. 1 is a view schematically illustrating an infrastructure network.
Figure 2:
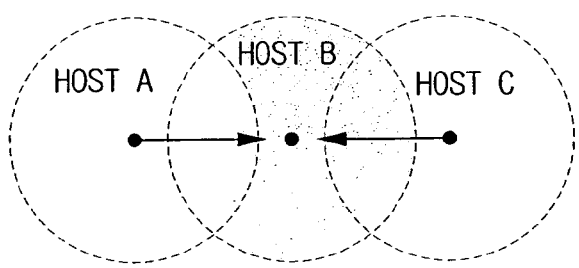
FIG. 2 is a view schematically illustrating an ad-hoc network.
Figure 3:
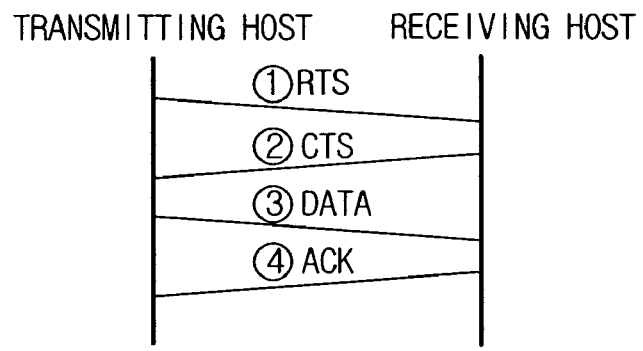
FIG. 3 is a view illustrating the operational principle of a MACA protocol.
Figure 4:
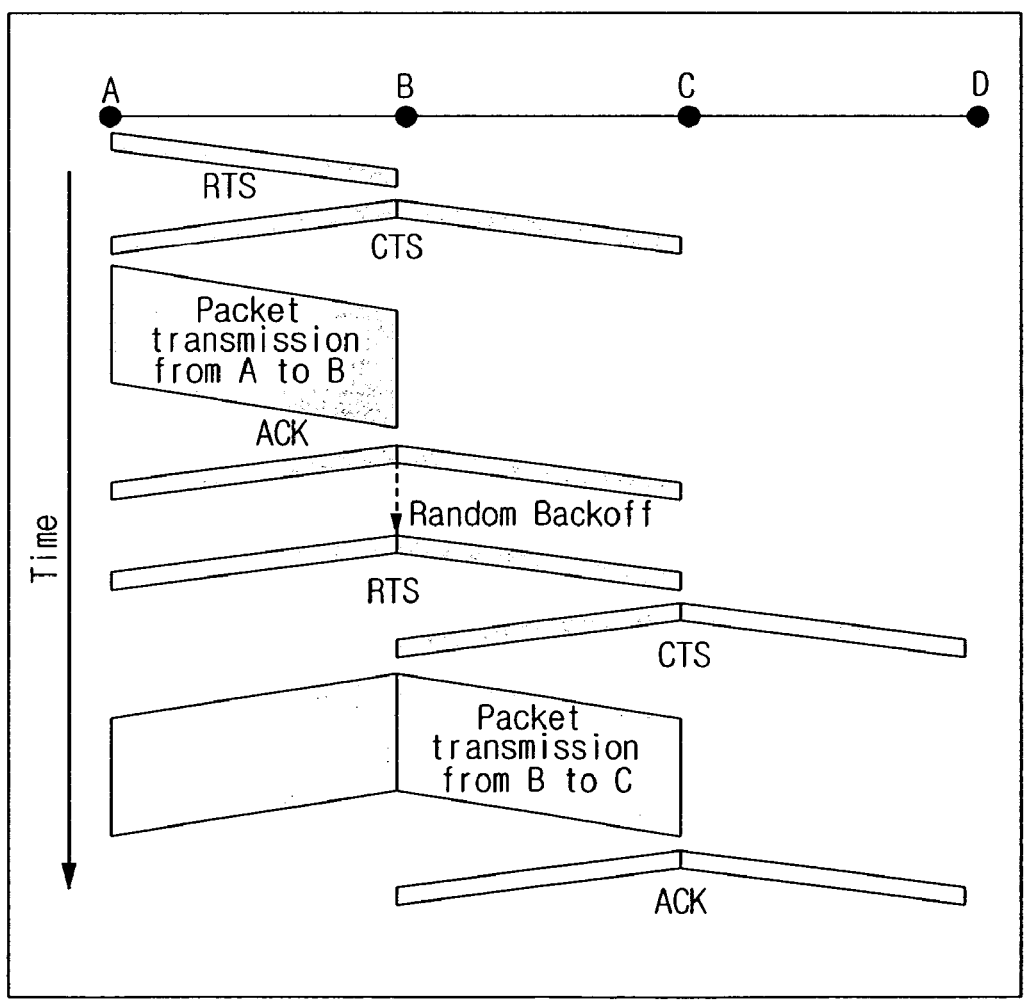
FIG. 4 is a view illustrating the operational principle of a MACAW protocol.
Figure 5A:
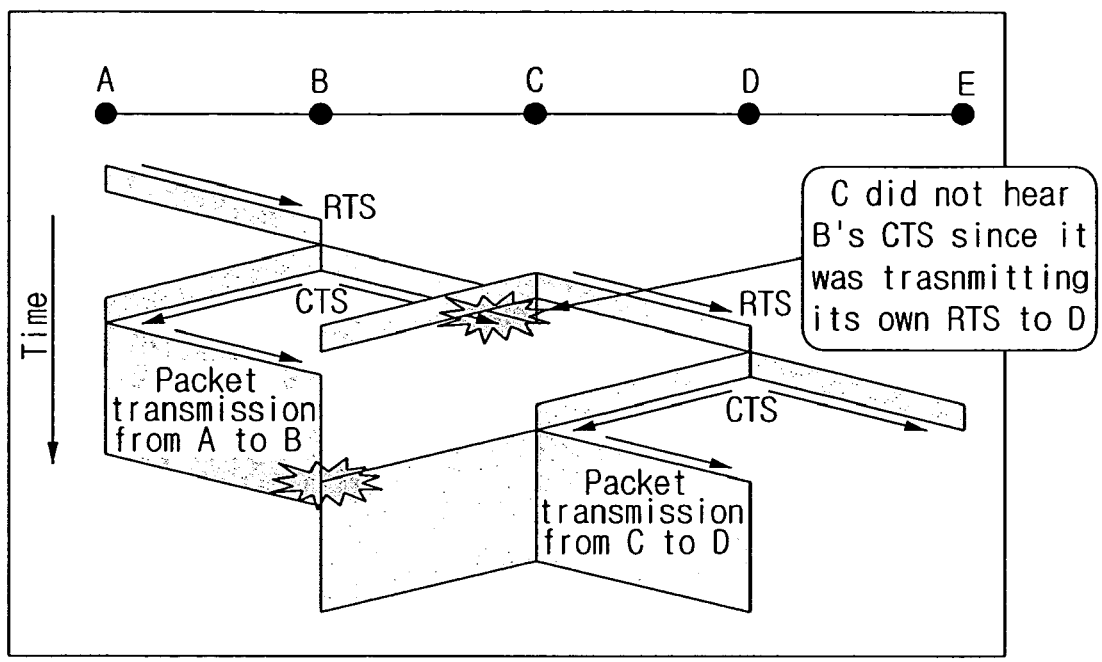
FIGS. 5A and 5B are views explaining hidden host problems in a MACAW protocol.
Figure 5B:
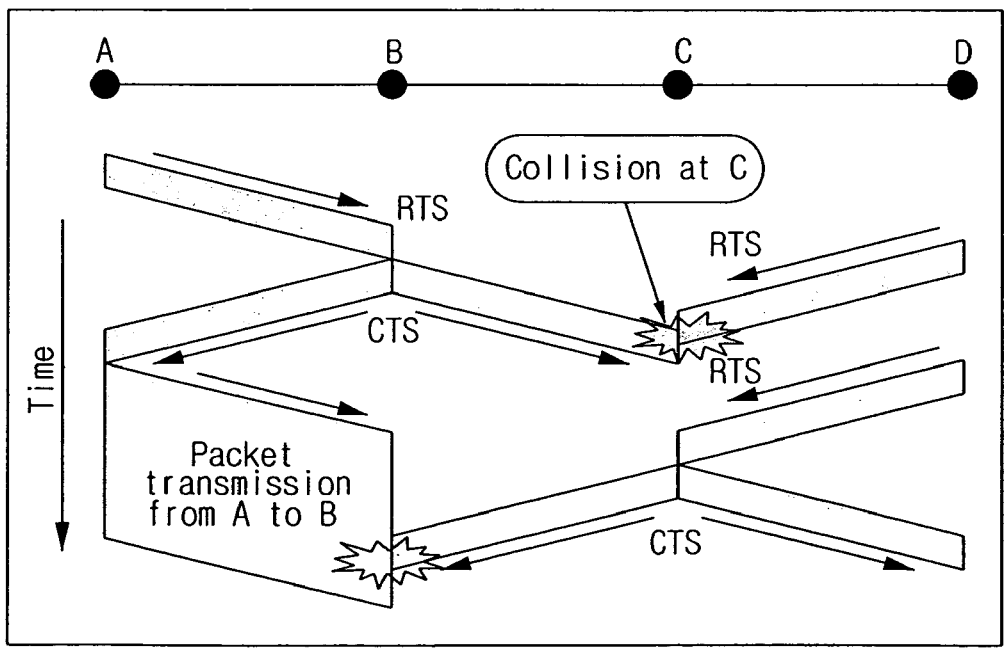
Figure 6:
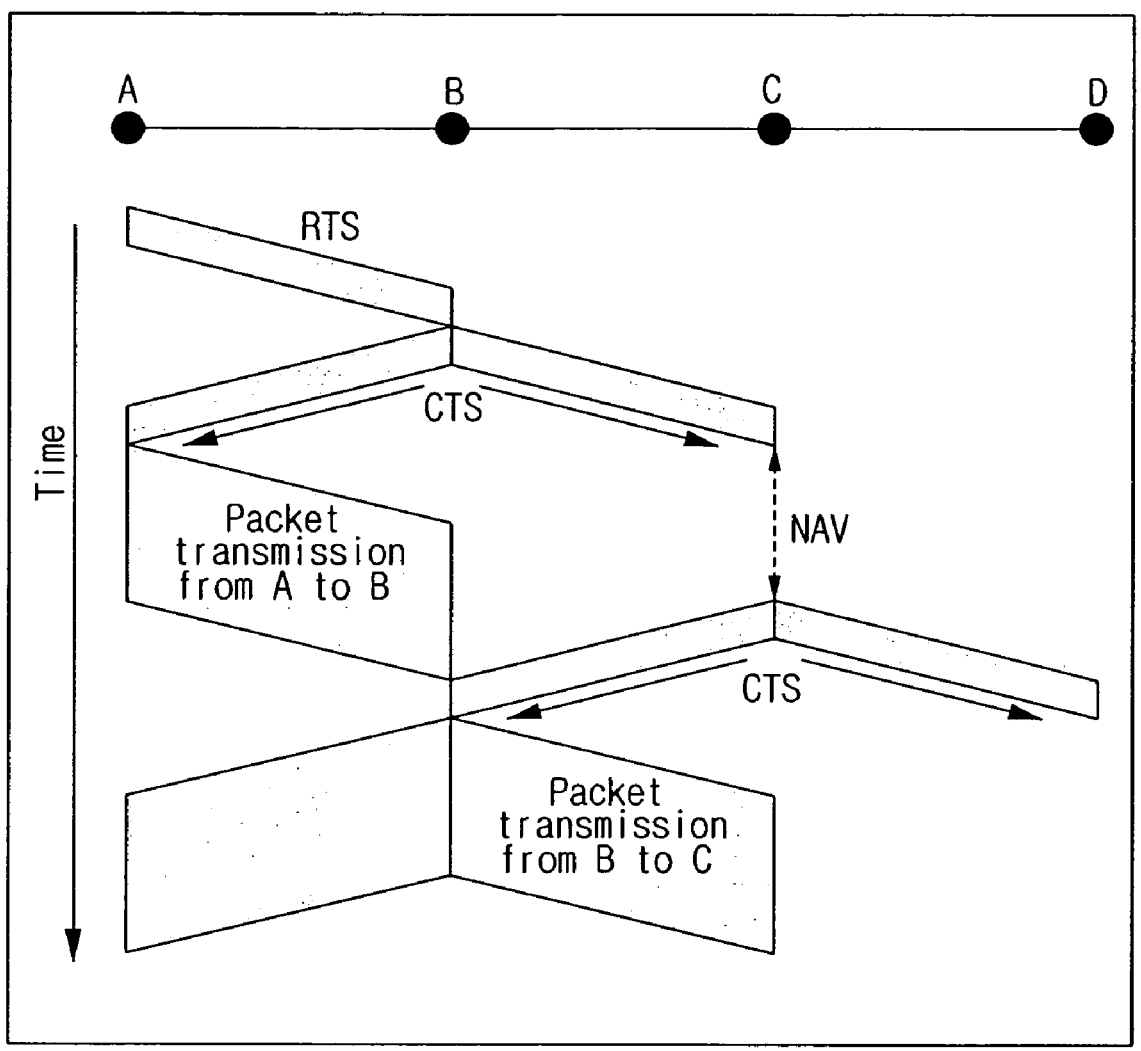
FIG. 6 is a view illustrating the operational principle of a MARCH protocol.
Figure 7:
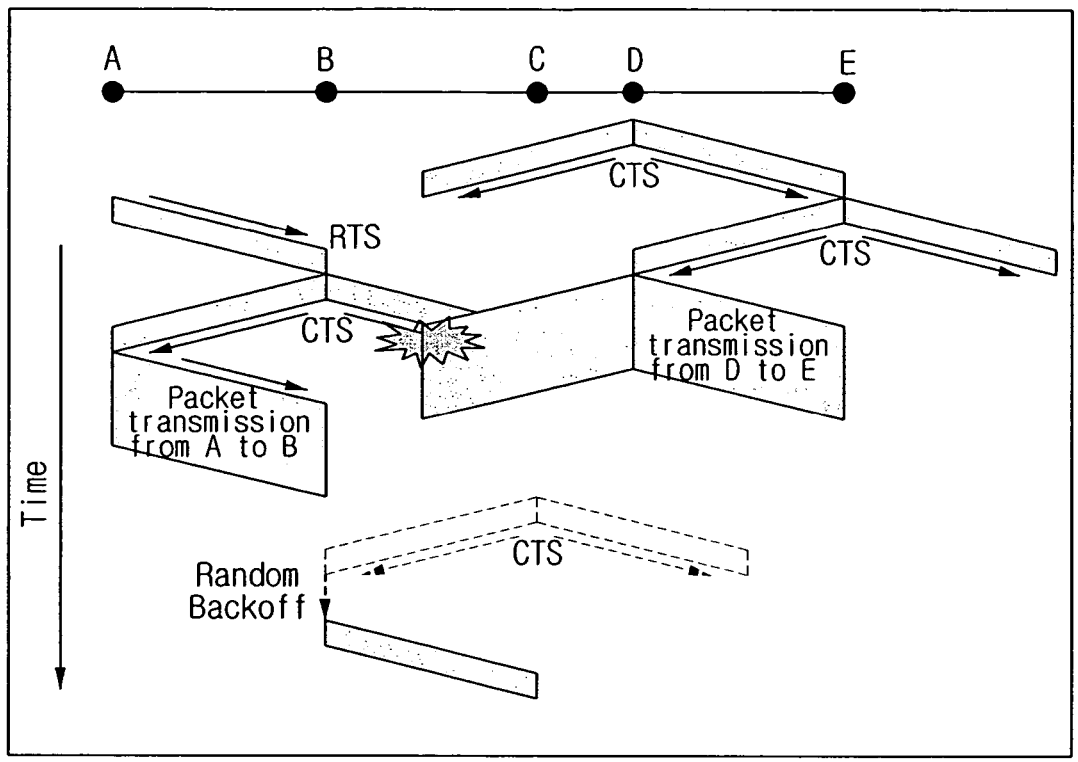
FIG. 7 is a view illustrating an example of a new hidden host problem caused in a MARCH protocol.
Figure 8:
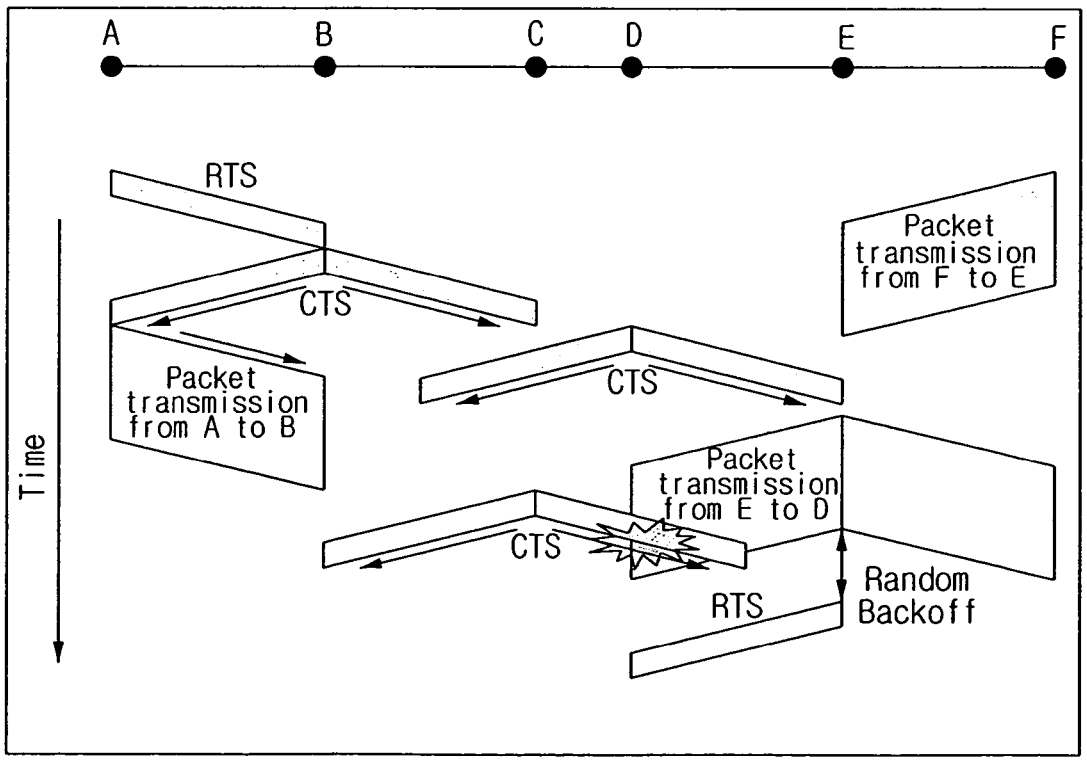
FIG. 8 is a view illustrating another example of a new hidden host problem caused in a MARCH protocol.
Figure 9:
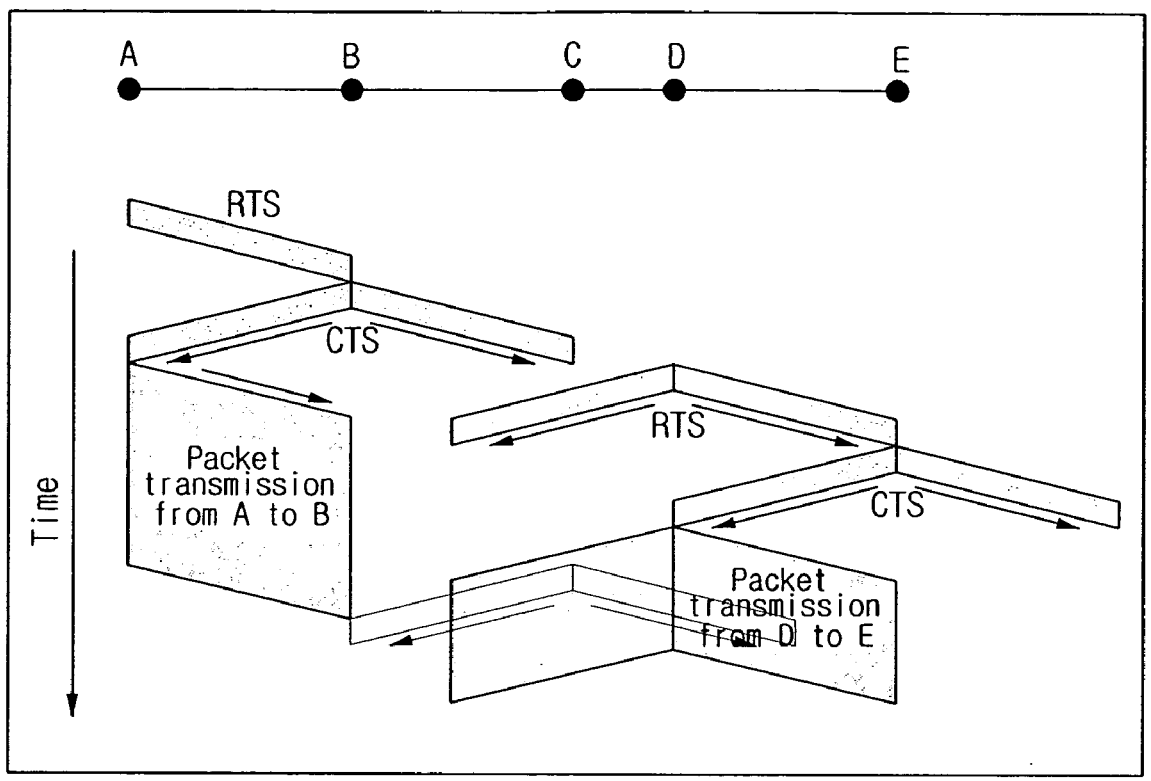
FIG. 9 is a view illustrating a CTS blocking problem caused in a MARCH protocol.

Now, an ad-hoc network wireless communication system and a method thereof according to the present invention will be described in detail with reference to the annexed drawings in which like reference numerals refer to like elements.

Figure 10:
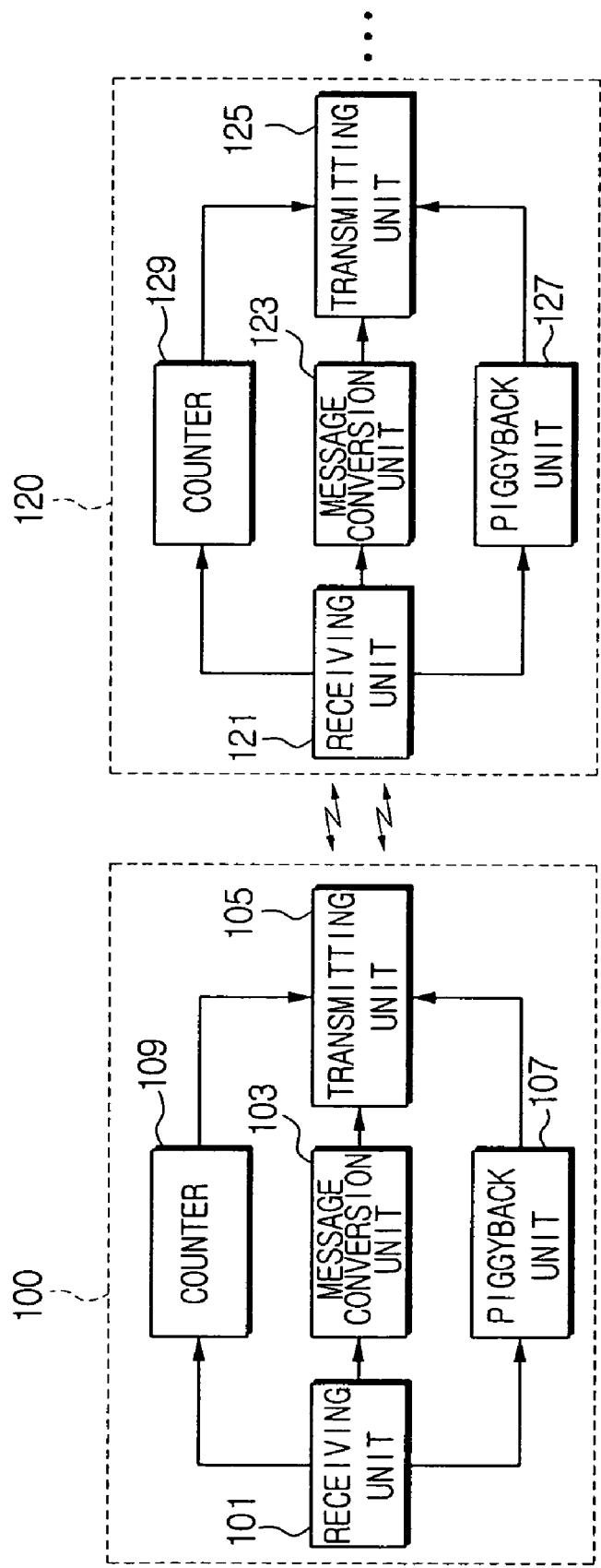
FIG. 10 is a block diagram schematically illustrating an ad-hoc network wireless communication system according to the present invention.

FIG. 10 is a block diagram schematically illustrating an ad-hoc network wireless communication system according to the present invention. Referring to FIG. 10, wireless communication appliances 100 and 120 includes receiving units 101 and 121, message conversion units 103 and 123, transmitting units 105 and 125, piggyback units 107 and 127, and counters 109 and 129, respectively. Here, although the wireless communication appliances 100 and 120 are illustrated as a transmitting node 100 for transmitting data and a receiving node 120 for receiving the transmitted data, they are not separately provided, but serve as both the transmitting node 100 and the receiving node 120 in a plurality of wireless communication appliances.

The transmitting node 100 transmits an RTS message in order to transmit data packets. Here, the RTS message follows the MAC protocol based on the IEEE 802.11 DCF, and means a control packet that a node, which intends to first start the data transmission, transmits to perform the data transmission.

The receiving node 120 that exists in the next hop of the transmitting node 100 transmits a CTS message in response to the RTS message received from the transmitting node 100. Here, the CTS message is a response to the RTS message received from the transmitting node 100, and serves as an ACK control packet that is transmitted to clear the channel. Also, the CTS message, with respect to a receiving node (not illustrated) existing in the next hop, serves as an RTS control packet transmitted to clear the channel of the next path. Also, the CTS message serves as a control packet to inform the start of the data packet transmission with respect to the first data source node, i.e., the transmitting node 100 or node that waits for the transmission of the data packet. In order to serve as the receiving node, the wireless communication appliance 120 is provided with the receiving unit 121, the message conversion unit 123 and the transmitting unit 125.

That is, the receiving unit 121 receives the RTS message transmitted from the transmitting node 100, or receives the CTS message transmitted from the receiving node 120 located in the previous hop along with the receiving node existing in the next hop.

The message conversion unit 123 converts the CTS message into the RTS message so that the CTS message received from the received from the receiving node 120 located in the previous hop serves as the RTS message with respect to the receiving node (not illustrated) located in the next hop.

The transmitting unit 125 transmits the CTS message in response to the RTS message received from the transmitting node 100 or the RTS message converted by the message conversion unit 123. The CTS message transmitted by the transmitting unit 125 is transmitted to the transmitting node or the receiving node existing in the previous hop and simultaneously to the receiving node existing in the next hop. At this time, the CTS message transmitted to the transmitting node or the receiving node existing in the previous hop serves as a response packet to the RTS message or the CTS message or as a control packet to inform the transmission of the data packet. The CTS message transmitted to the receiving node existing in the next hop serves as a control packet to clear the channel of the next path.

Figure 11:
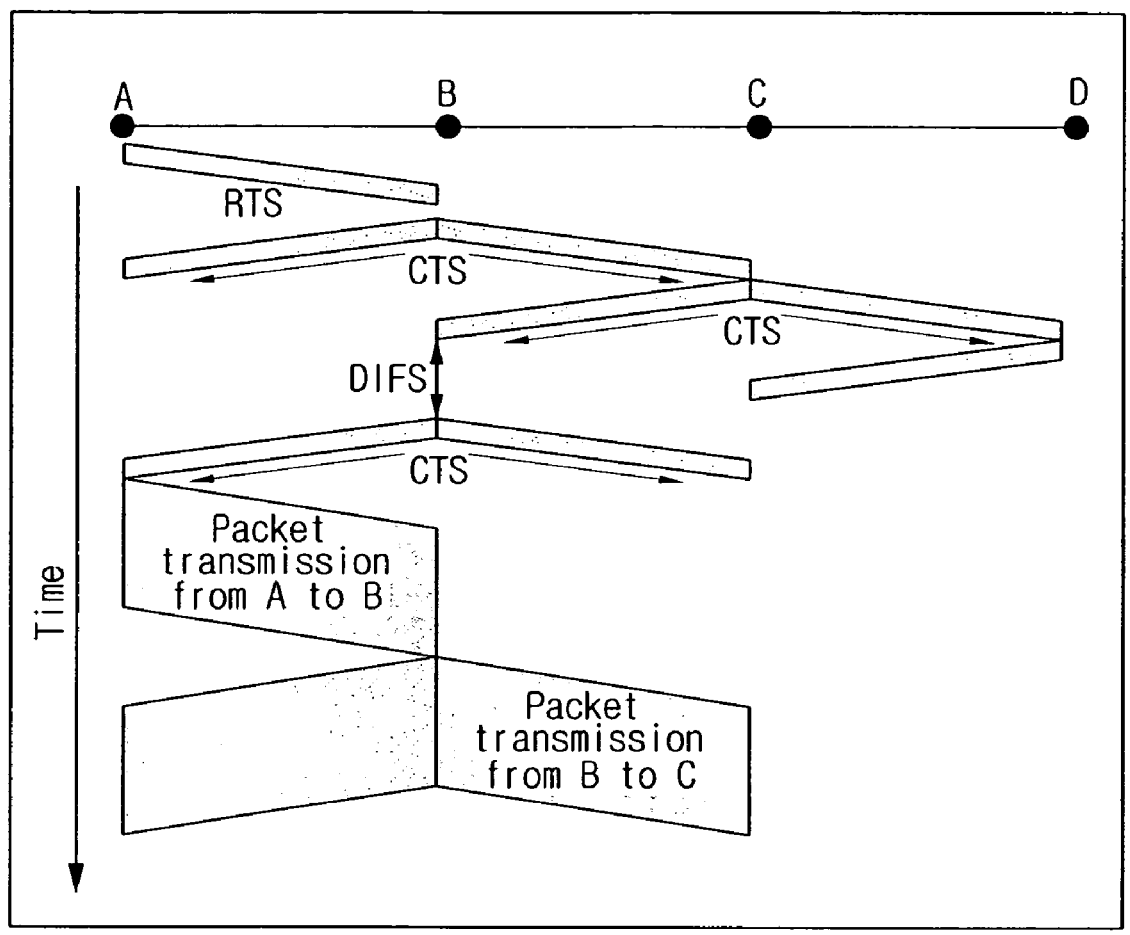
FIG. 11 is a view explaining the operational principle of the wireless communication system of FIG. 10.

FIG. 11 is a view explaining the operational principle of the wireless communication system of FIG. 10. Referring to FIG. 11, a node A, as a transmitting node, transmits an RTS message in order to transmit data packets to a node B existing in the next hop. The node B transmits a CTS message in response to the RTS message transmitted by the node A. The CTS message transmitted by the node B is transmitted to the node A that is the transmitting node and the node C existing in the next hop of the node B. At this time, the CTS message transmitted to the node A is a response to the RTS message, and serves as a control packet to clear the channel between the node A and the node B. Also, the CTS message transmitted to the node C is simultaneous with the CTS message being transmitted to the node A, and serves as the control packet to clear the channel between the node B and the node C.

The node C transmits the CTS message to the node B existing in the previous hop and the node D existing in the next hop in response to the received CTS message. That is, the message conversion unit 123 of the node C that is the receiving node 120 converts the CTS message received by the receiving unit 121 into the RTS message, and transmits the CTS message to the node B and the node D in response to the converted RTS message.

The receiving unit of the node B that is the receiving node 120 receives the CTS message transmitted by the node C, and transmits the CTS message in response to the received CTS message. That is, the message conversion unit 123 of the node B converts the CTS message received from the node C into the RTS message, and transmits the CTS message to the node A and simultaneously to the node C in response to the converted RTS message. At this time, in the case that the node B transmits the CTS message to the node A and the node C, it is preferable that in order to avoid the collision among the packets transmitted/received among the respective nodes, the node B receives the CTS message from the node C, and then transmits the CTS message corresponding to the converted RTS message after the DIFS time. That is, the node B confirms whether the channel is occupied for the DIFS that is a relatively long time, and then performs the transmission of the CTS message after a delay for a predetermined time through a random back-off mechanism. At this time, all the remaining nodes perform the transmission of the CTS message without any back-off delay time after a minimum delay that is called a SIFS (Short Inter Frame Space).

The node B informs the node A of the start of the data packet transmission by transmitting the CTS message to the node A, and the node A transmits the data packets in response to the received CTS message. If the node B receives the data packets transmitted by the node A, the node B transmits the received data packets to the node A and the node C, resulting in that the data packets are transferred from the node A to the node D through the node B and the node C.

Meanwhile, in the case that the node B transmits the data packets received from the node A to the node A and the node C, it is preferable that the node B that is the receiving node 120 informs that the transmission of the data packets has normally been performed by piggybacking the ACK packet to the data packets. For this, it is preferable that the receiving node 120 is provided with the piggyback unit 127 for piggybacking the ACK message to the received data packet. The transmitting unit 125 of the node B that is the receiving node 120 informs that the data packet is normally received by transmitting the data packet to which the ACK message is piggybacked by the piggyback unit 127 to the node A and simultaneously to the node C, so that the data packet is transferred. Accordingly, the ad-hoc network wireless communication system according to the present invention does not require a separate ACK control packet, and since the transmission of all the data is performed in the unit of a hop at intervals of the SIFS time, the wireless communication system makes it possible to implement an ARQ (Automatic Repeat Request) mechanism by piggybacking the normal/abnormal state of the received data to the data.

Meanwhile, it is preferable that if the CTS message from the node B existing in the next hop is received over the predetermined number of times, the node A that is the transmitting node A transmits the data packet to the node B. This is for removing the hidden host problem occurring in the MACA protocol by making an RTS/CTS handshaking in progress for at least two hops. In order to perform this function, it is preferable that the node A, which is the transmitting node 100, is provided with a counter 109. The counter 109 counts the number of receptions of the CTS message received from the node B, and the transmitting unit 105 of the node A transmits the data packet to the node B if the number of receptions of the CTS message counted by the counter 109 is over a predetermined value.

As described above, the ad-hoc network wireless communication system according to the present invention can maximize the communication efficiency in a multi-hop network with its complexity minimized by extending the MAC protocol based on the IEEE 802.11 DCF to a reservation-based MAC in the multi-hop network. In the drawings, although the transmitting node 100 and the receiving node 120 are separately illustrated in consideration of their functions, i.e., the packet transmission and reception, it is preferable that the wireless communication appliances constituting the ad-hoc network have the same construction.

Figure 12:
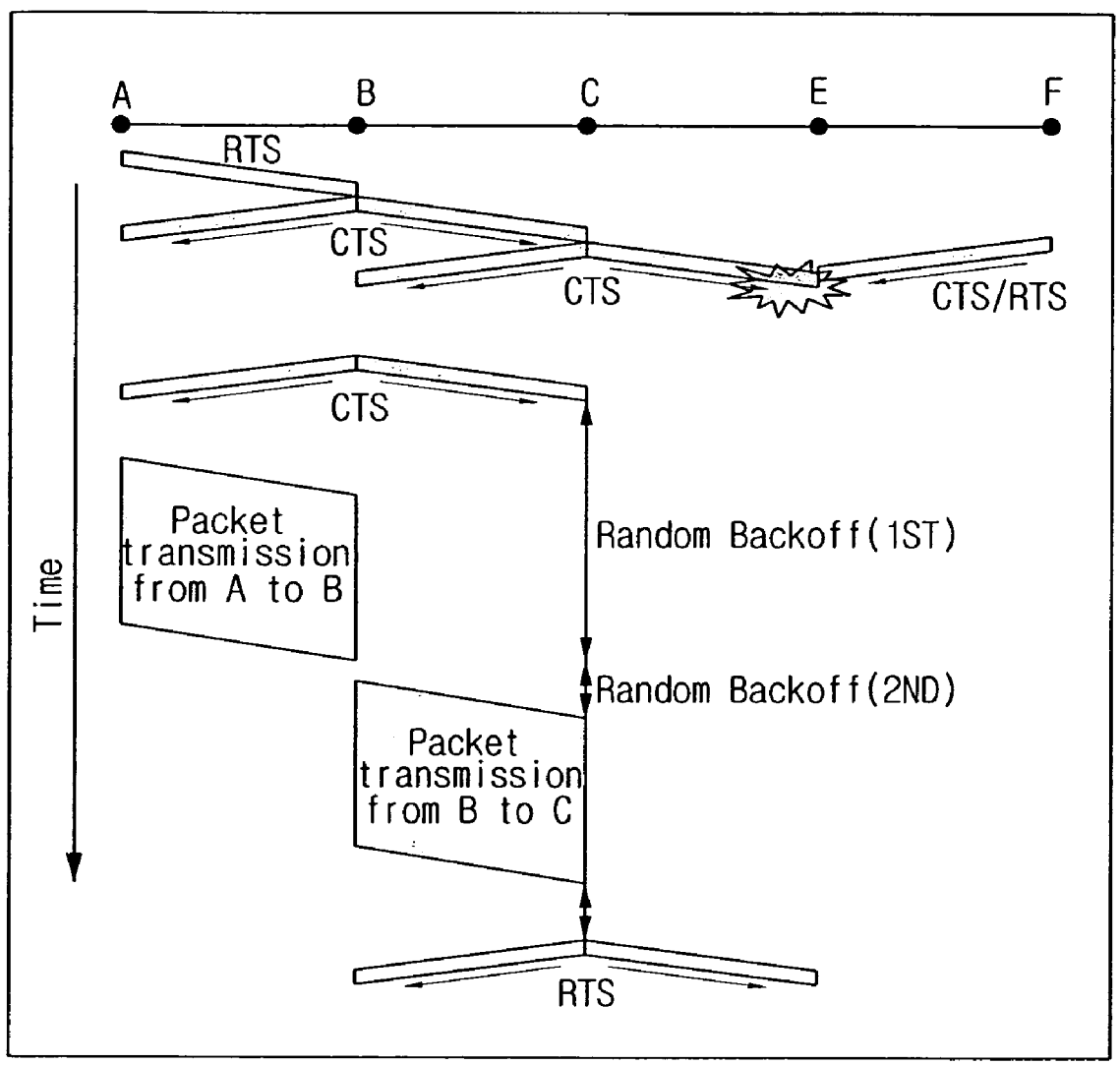
FIG. 12 is a view explaining the case that another terminal pre-occupies a channel of the corresponding area and thus the transmission of the CTS message is delayed in a relay process of the CTS message.

Meanwhile, as shown in FIG. 12, during the relay process of the CTS message, another terminal may preoccupy the channel of the corresponding area to make the transmission of the CTS message be delayed. In this case, the receiving node does not perform the transmission of the CTS message any more, but selects a back-off window value through a binary exponential random back-off mechanism, which is DIFS>SIFS, and then reduces the selected back-off window value as waiting until the data transmission through all the reserved paths is completed. If the back-off window time elapses before the data reception, the node resets the back-off window value, and waits for the reception as it performs the same process. Accordingly, even if another terminal occupies the channel of the corresponding area during the relay process of the CTS message, a smooth packet transmission can be performed with the transmission delay of the CTS message minimized.

Figure 13:
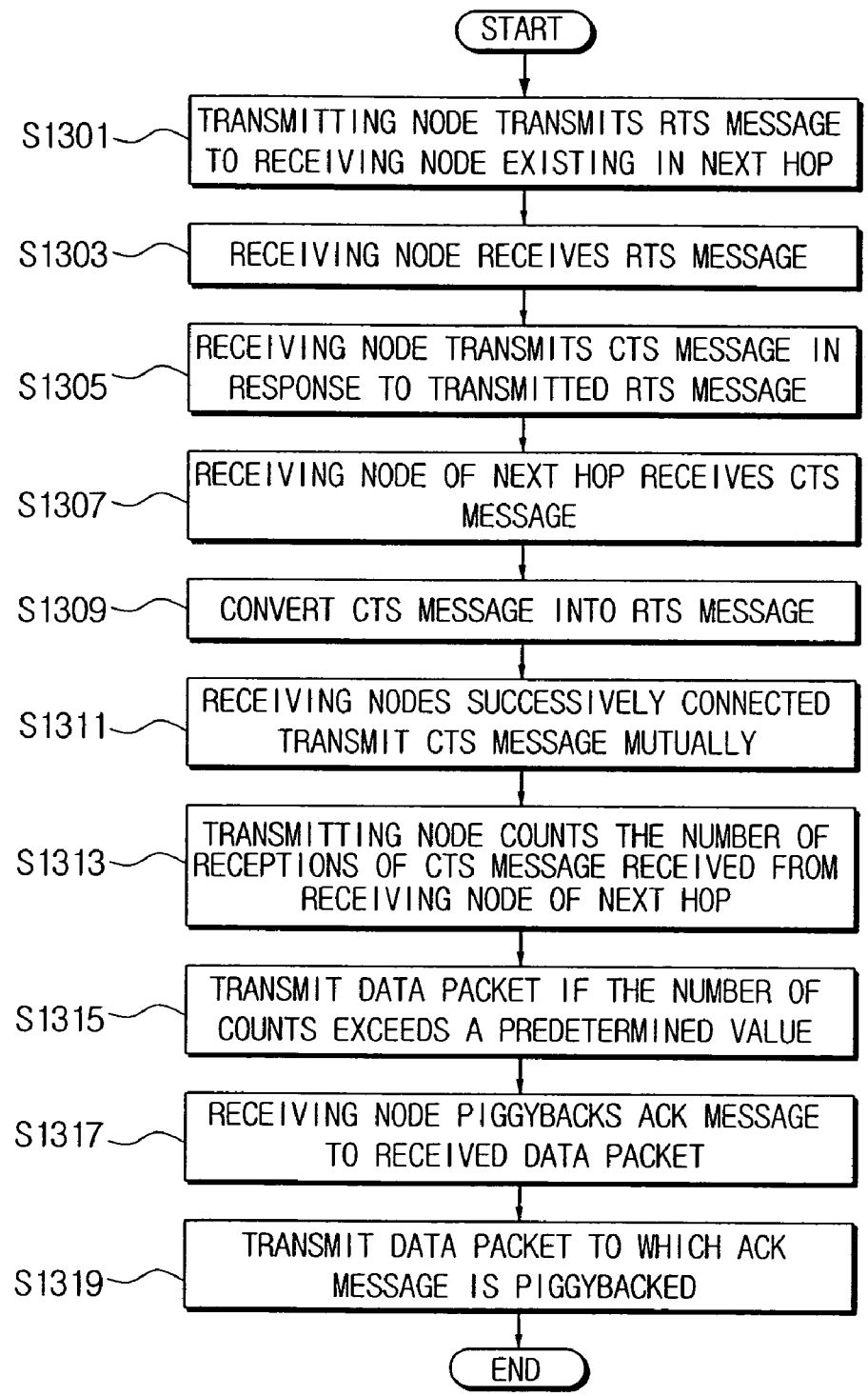
FIG. 13 is a flowchart illustrating an ad-hoc network wireless communication method performed by the system of FIG. 10.

FIG. 13 is a flowchart illustrating an ad-hoc network wireless communication method performed by the system of FIG. 10. Referring to FIG. 13, the node A that is the transmitting node 100 transmits the RTS message in order to transmit the data packets to the node B that is the receiving node 120 existing in the next hop (step S1310). The receiving unit 121 of the node B that is the receiving node 120 receives the RTS message transmitted by the node A (step S1303). Then, the node B transmits the CTS message to the node A and the node C in response to the received RTS message (step S1305). The node C that is the receiving node 120 existing in the next hop of the node B receives the CTS message transmitted by the node B (step S1307). The message conversion unit 123 of the node C converts the received CTS message into the RTS message (step S1309). Also, the transmitting unit 125 of the node C transmits the CTS message in response to the converted RTS message. The CTS message transmitted by the node C is transmitted to the node B and the node D, and the node B transmits the CTS message in response to the CTS message received from the node C. That is, the CTS message is transmitted between the node B and the node C successively connected to each other (step S1311). The CTS message transmitted by the node B is transmitted to the node A and the node C.

Meanwhile, the counter 109 of the node A that is the transmitting node 100 counts the number of receptions of the CTS message received from the node B that is the receiving node 120 (step S1313). If the number of receptions of the CTS message counted by the counter 109 exceeds a predetermined value, the node A transmits the data packet to the node B (step S1315). The piggyback unit 127 of the node B that is the receiving node 120 piggybacks the ACK message to the received data packet (step S1317). The node B informs that the data packet has normally been received by transmitting the data packet to which the ACK message is piggybacked by the piggyback unit 127 to the node A and simultaneously to the node C, so that the data packet is transferred.

Figure 14:
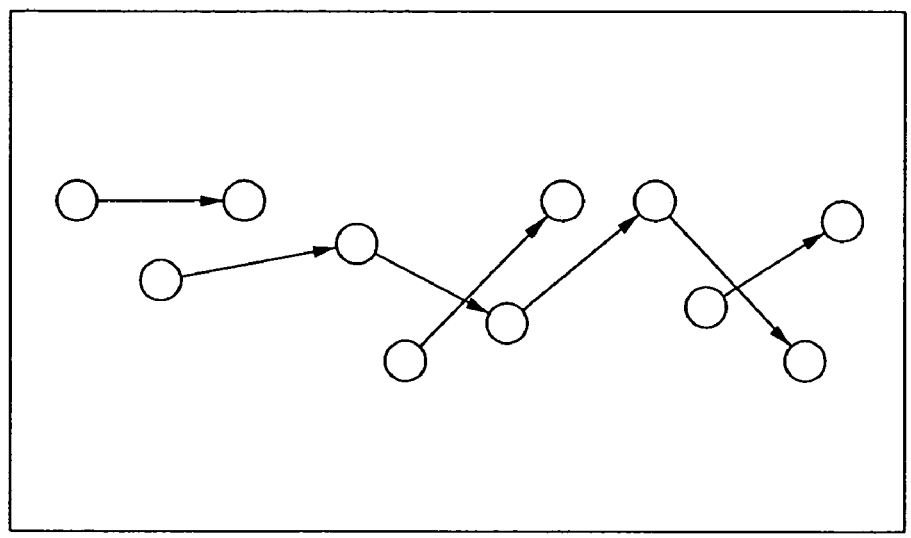
FIG. 14 is a view illustrating a single-connection scenario as an example of simulation of the present invention.
Figure 15:
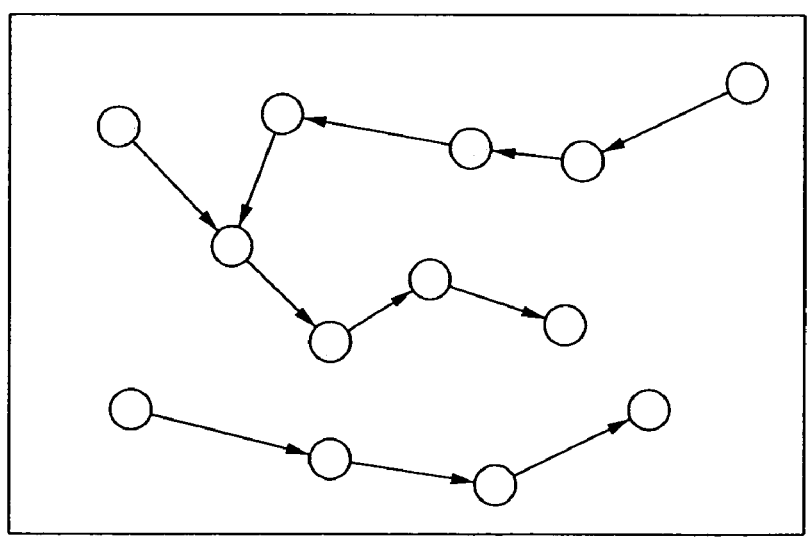
FIG. 15 is a view illustrating a multiple-connection scenario as another example of simulation of the present invention.

FIG. 14 a view illustrating a single-connection scenario as an example of simulation of the present invention, and FIG. 15 is a view illustrating a multiple-connection scenario as another example of simulation of the present invention. Variable values used in the simulation are described in Table 1 below.

TABLE 1

| Parameters | Values | Note |
| --- | --- | --- |
| Length of Control Packet | 160 bytes | RTS/CTS |
| Length of Data Packet | 1024 bytes | Variable in Figure |
| DIFS | 50 us | DCF IFS |
| SIFS | 10 us | Short IFS |
| Back-off Slot | 20 us | |
| Cwmin | 32 | |
| Cwmax | 1024 | |
| Transmission range | 10 m | RTS/CTS/Data |
| Data rate | 2 Mbps/11 Mbps | 2 Mbps for topology (a) 10 Mbps for topology (b) |

Figure 16:
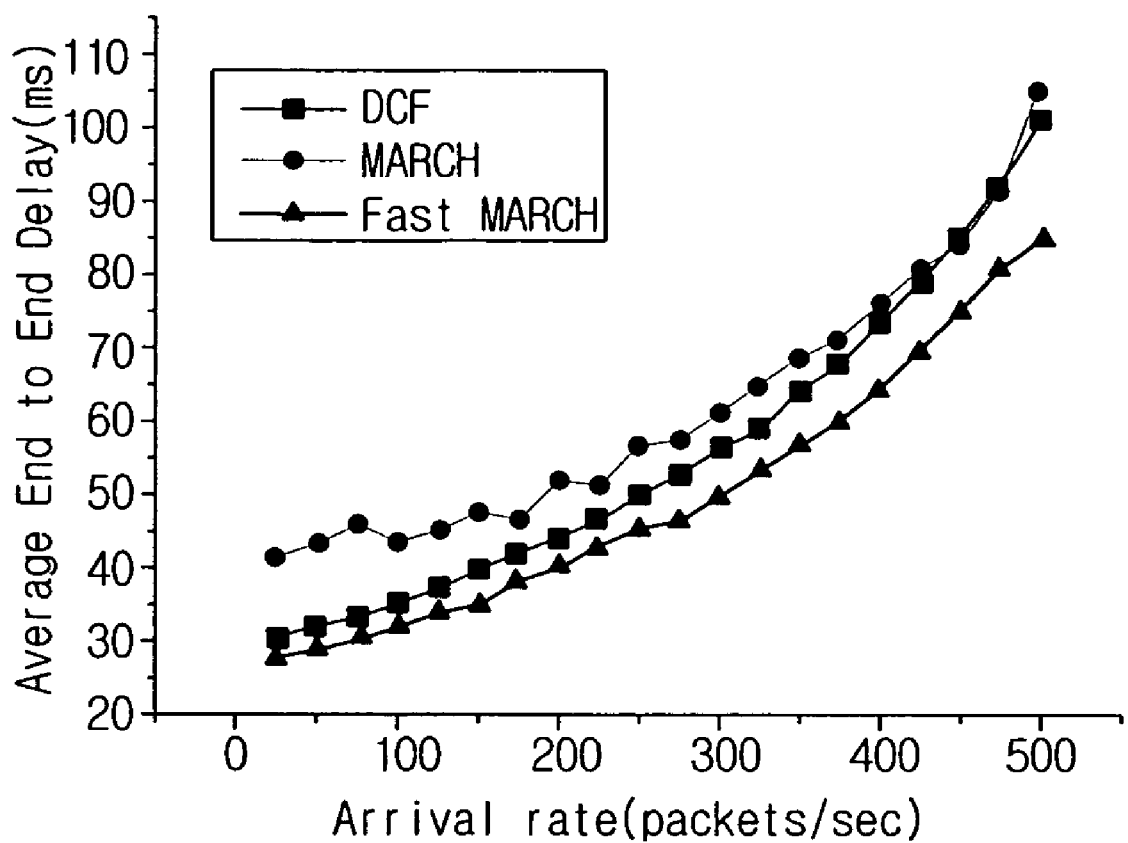
FIG. 16 is a view illustrating the change of end-to-end delays of a packet according to the increase of a traffic generation rate of an interference node in a network topology such as in FIG. 14.
Figure 17:
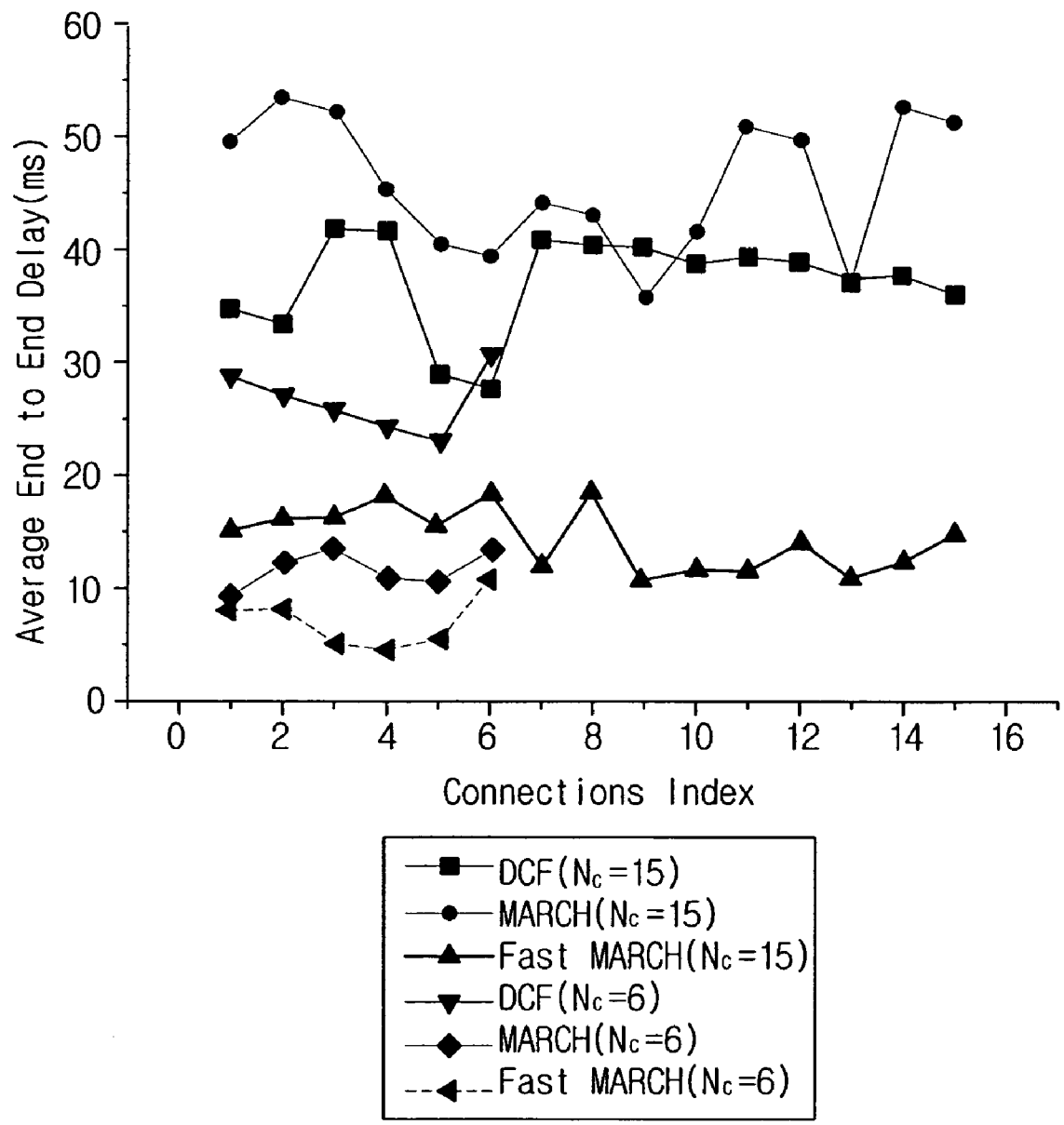
FIG. 17 is a view illustrating end-to-end delays appearing by connections when 15 and 6 connections are respectively activated in a network topology such as in FIG. 15.

FIG. 16 is a view illustrating the change of end-to-end delays of a packet according to the increase of a traffic generation rate of an interference node in a network topology such as in FIG. 14, and FIG. 17 is a view illustrating end-to-end delays appearing by connections when 15 and 6 connections are respectively activated in a network topology such as in FIG. 15. As shown in FIG. 16, it can be recognized that all the three comparative mechanisms show the end-to-end delays that increase as the arrival rate of the interference node increases. It can be recognized that among the systems, the proposed system shows the most superior performance. Also, as shown in FIG. 17 illustrating the end-to-end delays by connections, the paths of the respective connections have different numbers of activated terminals connected thereto, and thus the respective connections have the different end-to-end delays.

Figure 18:
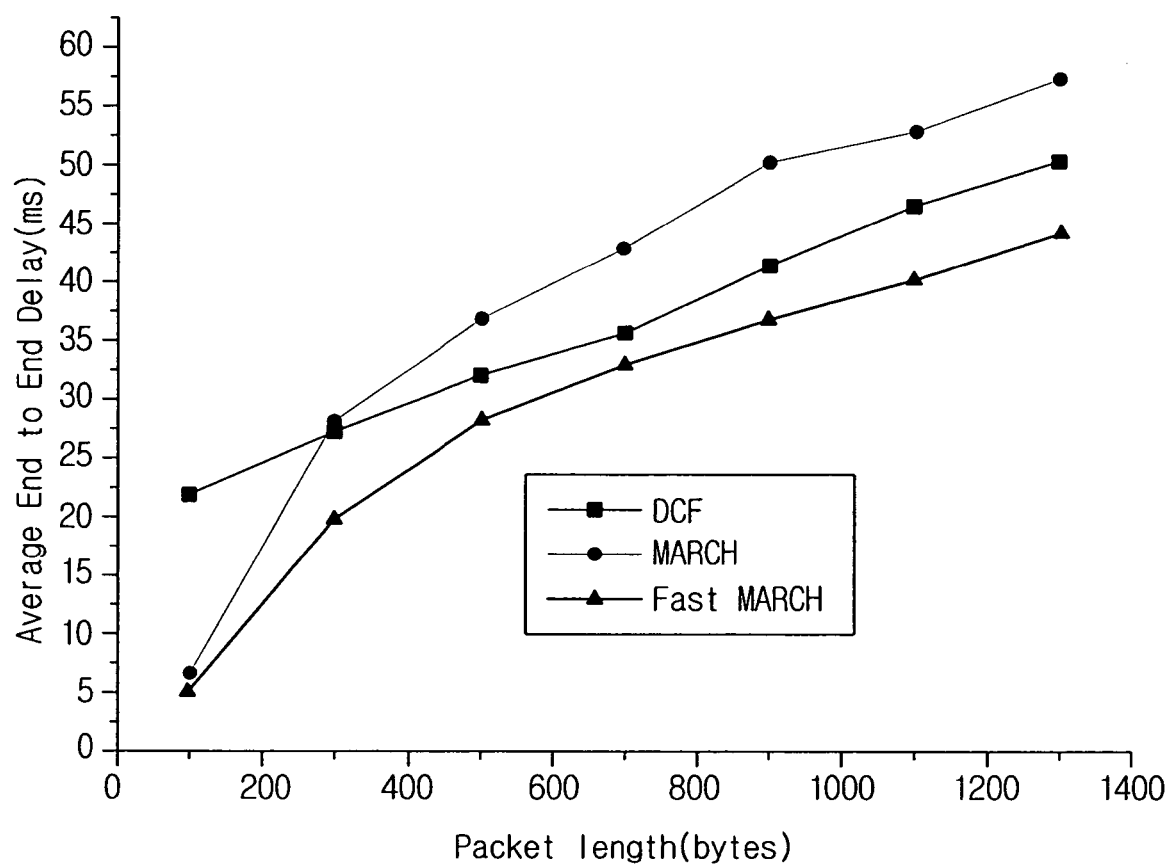
FIG. 18 is a view illustrating the change of average values of the end-to-end delay for a packet length in the same state of congestion.

FIG. 18 is a view illustrating the change of average values of an end-to-end delay for a packet length in the same state of congestion. Referring to FIG. 18, it can be recognized that when the averages of the end-to-end delays are observed as the lengths of the respective data are changed in the network topology environment as in FIG. 14, the proposed system shows the lowest average of the end-to-end delays for the same packet length. This means that the delay performance of the proposed system is most superior, and the delay performance felt by all the connections is uniform in comparison to other systems.

Figure 19:
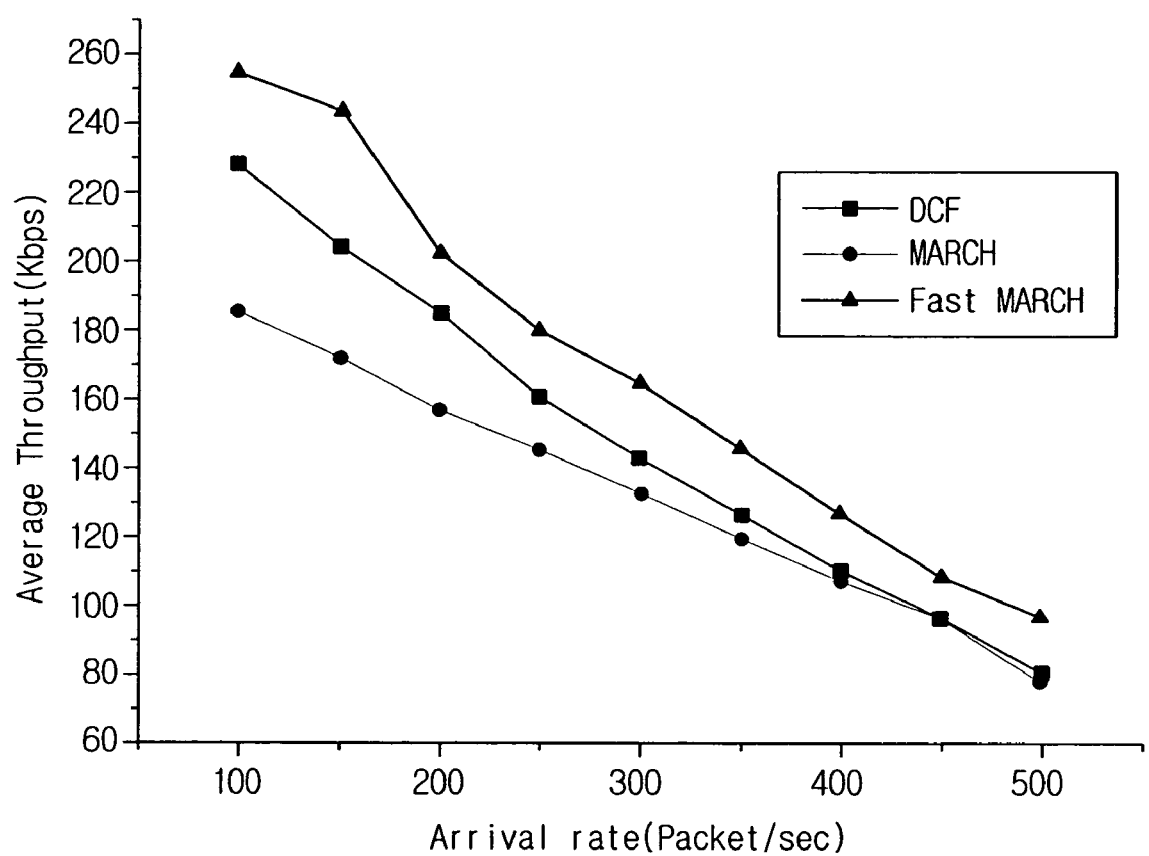
FIG. 19 is a view illustrating the amount of data transferred from a source node to an object node when the data transmission is performed for a predetermined time in the same state of congestion.

FIG. 19 is a view illustrating the amount of data transferred from a source node to an object node when the data transmission is performed for a predetermined time in the same state of congestion. Referring to FIGS. 18 and 19, the change of throughput transferred to the object node for a predetermined time in the network topology environment as in FIG. 14 is observed. In this case, since the hidden host is produced due to the collision of a relatively long data packet with the CTS control packet, it can be recognized that as the length of the packet is shortened, the delay performance is improved, and the proposed system has the most superior throughput.

As described above, the ad-hoc network wireless communication system according to the present invention is free from the hidden host and has an improved end-to-end delay characteristic and a superior throughput in comparison to a DCF even in the case that a CSMA/CA-based MAC protocol is extended to a multi-hop. Also, the ad-hoc network wireless communication system according to the present invention can make a reliable multi-hop ad-hoc communication possible by applying an algorithm of a two-hop look ahead handshaking mechanism to the RTS/CTS handshaking system of the wireless LAN based on the IEEE 802.11.

While the present invention has been described in detail, it should be understood that various changes, substitutions and alterations can be made hereto without departing from the spirit and scope of the invention as defined by the appended claims.

What is claimed is:

1. An ad-hoc network wireless communication system that transmits data packets from one hop to another hop in a relay manner, the communication system comprising:
   a transmitting node operable to transmit a request-to-send (RTS) message in order to transmit the data packets; and
   a receiving node, existing in a next hop of the transmitting node, operable to transmit a responsive clear-to-send (CTS) message in response to the RTS message transmitted from the transmitting, node, and operable to transmit a responsive CTS message in response to a CTS message transmitted from another receiving node successively connected to the receiving node, the receiving node comprising:
      a receiving unit operable to receive at least one of the group consisting of the RTS message and the CTS message,
      a message conversion unit operable to convert the CTS message into a converted RTS message, and
      a transmitting unit operable to transmit a responsive CTS message in response to at least one of the group consisting of the received RTS message and the converted RTS message;
   wherein the receiving node transmits the responsive CTS message to another receiving node successively connected to the receiving node in response to the transmitted CTS message, and the transmitting node transmits the data packets to the receiving node in the case that responsive CTS messages transmitted by the receiving node of the next hop are received over a predetermined number of times.

2. The communication system as claimed in claim 1, wherein the receiving node existing in the next hop of the transmitting node transmits the responsive CTS message after a DCF-inter-frame-space (DIFS) time in response to the converted RTS message if the CTS message is received from another receiving node existing in the next hop.

3. The communication system as claimed in claim 2, wherein the receiving node further comprises a piggyback unit operable to piggyback an acknowledgement (ACK) message to the received data packet;
   wherein the transmitting unit transmits the data packet to which the ACK message is piggybacked by the piggyback unit to another receiving node.

4. The communication system as claimed in claim 3, wherein the receiving node and the transmitting node have the same construction.

5. The communication system as claimed in claimed 4, wherein the transmitting node includes a counter operable to count a number of receptions of responsive CTS messages received from the receiving node.

6. The communication system as claimed in claim 5, wherein the transmitting node transmits the data packet to the receiving node if the number of receptions of responsive CTS messages counted by the counter is 2.

7. A wireless communication method for an ad-hoc network wireless communication system that transmits data packets from one hop to another hop in a relay manner, the communication method including:
   (a) a transmitting node transmitting a request-to-send, (RTS) message to a receiving node existing in a next hop in order to transmit the data packets;
   (b) the receiving node transmitting a responsive clear-to-send (CTS) message in response to the transmitted RTS message;
   (c) the receiving node transmitting the responsive CTS message to another receiving node successively connected to the receiving node in response to the transmitted CTS message; and
   (d) the transmitting node transmitting the data packets to the receiving node of the next hop in the case that the transmitting node receives responsive CTS messages transmitted by the receiving node of the next hop over a predetermined number of times;
   (e) the receiving node receiving at least one of the group consisting of the RTS message and the CTS message; and
   (f) the receiving node converting the received CTS message into a converted RTS message:
   wherein the responsive CTS message is transmitted in response to at least one of the group consisting of the received RTS message and the converted RTS message.

8. The communication method as claimed in claim 7, wherein the receiving node existing in the next hop of the transmitting node transmits the responsive CTS message after a DCF-inter-frame-space (DIFS) time in response to the converted RTS message if the CTS message is received from another receiving node existing in the next hop.

9. The communication method as claimed in claim 8, further comprising:
   (g) the receiving node piggybacking an acknowledgement (ACK) message to the received data packet; and (h) transmitting the data packet to which the ACK message is piggybacked at step (g) to another receiving node.

10. The communication method as claimed in claim 9, wherein the receiving node and the transmitting node have the same construction.

11. The communication method as claimed in claim 10, further comprising (i) the transmitting node counting a number of receptions of responsive CTS messages received from the receiving node.

12. The communication method as claimed in claim 11, wherein the transmitting node transmits the data packet to the receiving node if the number of receptions of responsive CTS messages counted at step (i) is 2.

* * * * *